United States Patent [19]

Burt et al.

[11] Patent Number: 5,002,265

[45] Date of Patent: Mar. 26, 1991

[54] VARIABLE HEIGHT WORK HOLDER

[76] Inventors: Wayne E. Burt; Juanita E. Burt, both of Rte. 2, Box 131, Grove, Okla. 74344

[21] Appl. No.: 507,160

[22] Filed: Apr. 10, 1990

[51] Int. Cl.[5] .......... B23Q 3/00

[52] U.S. Cl. .......... 269/93

[58] Field of Search .......... 269/91-94, 269/239, 900, 99-100

[56] References Cited

U.S. PATENT DOCUMENTS

| | | | |
|---|---|---|---|
| 3,194,548 | 7/1965 | Zwick | 269/93 |
| 3,830,484 | 8/1974 | Bright et al. | 269/91 |
| 4,526,354 | 7/1985 | Mannes | 269/93 |

*Primary Examiner*—Robert C. Watson

*Attorney, Agent, or Firm*—Head & Johnson

[57] ABSTRACT

A variable height work holder for holding a work piece on a work table, such as a machine tool table, the table having a tie down bolt upwardly extending therefrom, the device including a heel member having an upwardly extending thick wall tubular portion with an upwardly spiraled upper surface defined by a series of steps, a pin affixed to the heel member coaxially of the tubular portion and an elongated clamping bar having an opening adjacent the inner end thereof slidably receiving the pin, the portion adjacent the outer end being configured to engage a work piece, the clamping bar having, intermediate the ends, a portion for receiving a tie down bolt therethrough, the spiraled stepped upper surface of the heel tubular portion providing means for supporting the inner end of the clamping bar at variable heights with respect to the work table.

4 Claims, 1 Drawing Sheet

VARIABLE HEIGHT WORK HOLDER

SUMMARY OF THE INVENTION

When machinists work on pieces supported on a work table it is frequently necessary to have means for clamping the pieces to the work table. As an example, a work table of a drill press, a milling machine, or the like must have provisions for holding down a work piece so that the work piece will not move with respect to the table while work is being performed on it. For this reason, most machine tables have an elongated T-shape slot therein that receives the head of an upstanding tie down bolt. The bolt can be used to receive a clamping bar and by use of a nut the clamping bar can be pulled down toward the table surface, the outer end of the clamping bar serving to engage the work piece. However, to work efficiently and effectively to clamp down a work piece and hold it securely, it is important that the clamping bar be held substantially parallel to the table work surface. It is a basic objective of this invention to provide a clamping bar and a stepped heel in combination therewith, the stepped heel providing improved means for supporting the inner end of the clamping bar at variable heights with respect to a work table.

The variable height work holder device of this disclosure includes a heel member having a generally planar lower surface for resting on the surface of a work table, such as the table of a drill press, machine tool or the like. The heel member has an integral upwardly extending thick wall tubular portion having an upwardly spiraled upper surface defined by a series of steps, the steps being increased increments of height above the heel member planar lower surface. The integral thick wall tubular portion of the heel member has a tubular axis thereof that is generally perpendicular to the heel member lower surface.

An elongated pin member has the lower end thereof secured to the heel member. The pin extends within the integral upwardly extending thick wall tubular portion, with the longitudinal axis of the pin being substantially coincident with the tubular member tubular axis. The pin member preferably has an enlarged diameter head at the upper end thereof.

An elongated clamping bar has an inner and an outer end, the inner end having an opening therein that slidably receives the pin member, the opening being of smaller diameter than the external diameter of the pin member head portion so that thereby the clamping bar and the heel member are secured to each other by the pin member.

The clamping bar has, adjacent the outer end thereof, a lower surface configured to engage a work piece. The intermediate portion of the clamping bar is configured to engage an upwardly extending tie down bolt extending from the work table. In the preferred arrangement the clamping bar is of U-shape configuration adjacent the outer end, providing an integral elongated slot therein for receiving a tie down bolt.

The clamping bar has, on the lower surface adjacent the inner end, an integral boss portion configured to engage individually a selected one of the series of steps forming the thick wall tubular portion upper surface.

To use the variable height work holder device, the outer end is positioned on a work piece in a manner desired for supporting the work piece so that the clamping bar outer end will not interfere with work to be performed on the work piece. The clamping bar is positioned so that a tie down bolt extending upwardly from the work table extends through the intermediate portion of the clamping bar. The heel portion is rotated to select a step of a height spacing above the heel member base that supports the clamping bar substantially parallel to the work table. Thereafter a nut on the tie down bolt is tightened, pulling the clamping bar toward the work table. The outer end of the clamping bar is thereby urged against the work piece, forcing it into increased contact with the work table, while the inner end is forced into contact with one of the steps on the heel member thick wall tubular portion spiraled upper surface so that as the nut on the tie down bolt is tightened, the clamping bar remains substantially parallel to the work table while applying the required force on the work piece to hold it against the work table.

Others have devised devices for holding down work pieces onto a work table and for reference to known prior art see the following U.S. Pat. Nos. 1,072,363; 1,758,733; 1,820,667; 2,351,436; 2,364,150; 2,421,957; 2,424,090; 2,499,408; 2,758,514 and 2,591,552.

A better understanding of the invention will be had by reference to the following description and claims, taken in conjunction with the attached drawings.

DESCRIPTION OF THE PREFERRED EMBODIMENT

Figure 2:
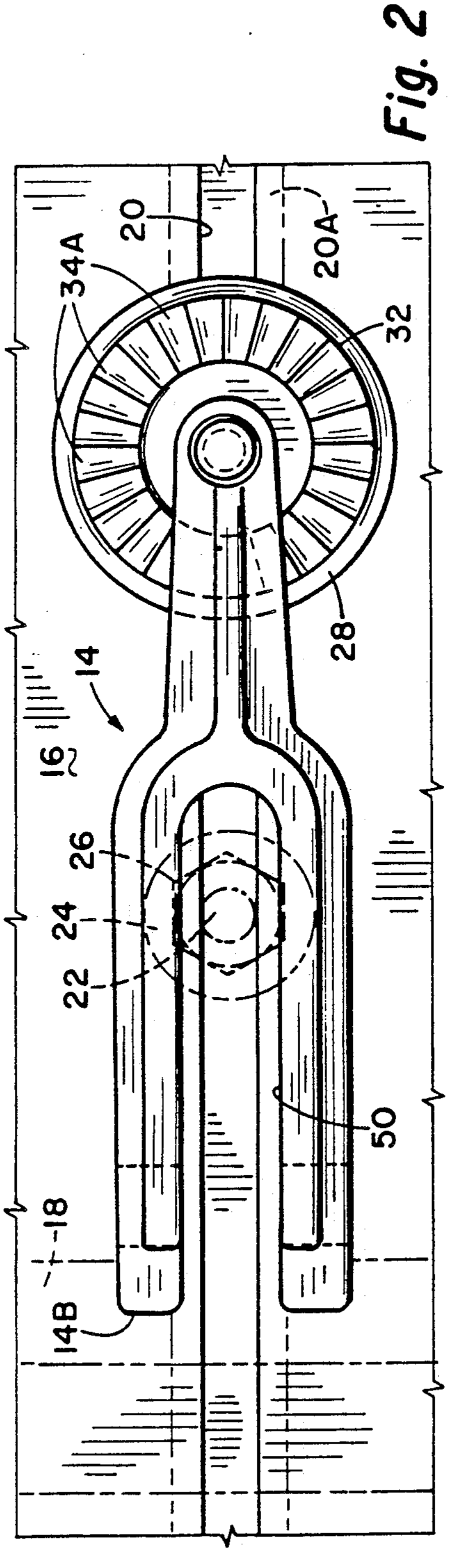
FIG. 2 is a top view of a portion of a table having the variable height work table clamp-down device of this invention thereon.
Figure 1:
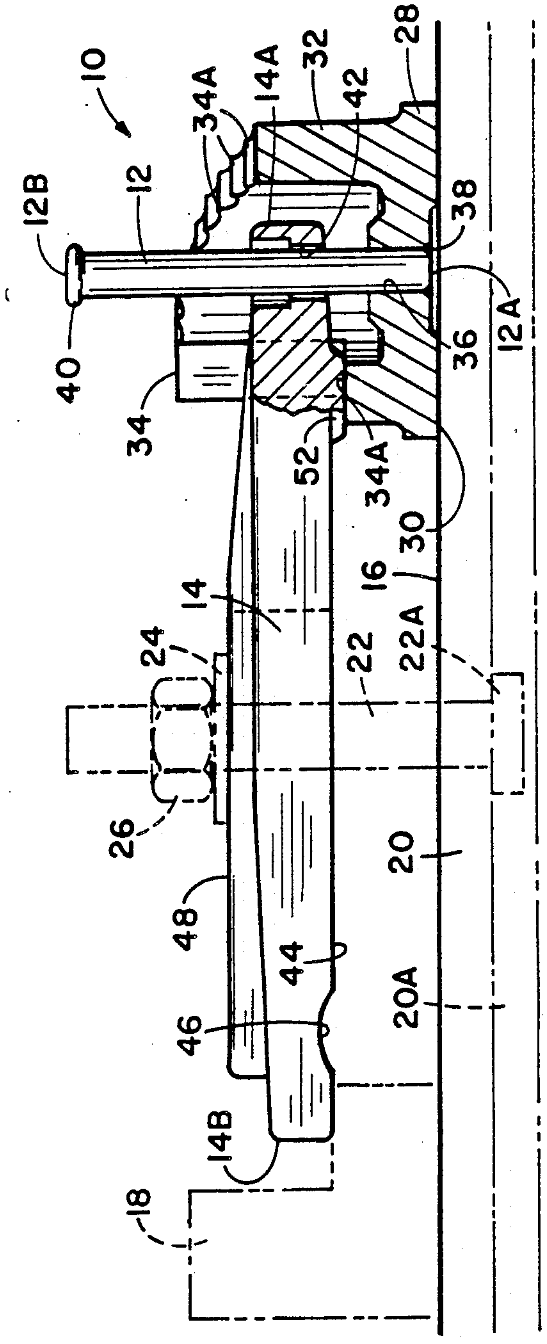
FIG. 1 is an elevational side view of the variable height work table clamp down device of this invention showing the elements thereof, the heel member element being shown in elevational cross-section and the clamping bar portion thereof being shown partially in cross-section adjacent the inner end thereof, and showing the use of a tie down bolt to hold the clamping bar outer end portion in contact with a work piece.

Referring to the drawings, the variable height work table clamp-down device of this invention is illustrated. The device is formed of three basic portions, that is, a heel member, generally indicated by the numeral 10; an elongated pin member 12; and an elongated clamping bar 14. The clamp-down device is intended for use on a work table 16 that may be such as employed as a part of a drill press, a milling machine, or any other type of work environment having a table on which work is to be performed on a work piece and for which it is necessary to hold the work piece in a fixed position. Shown supported on table 16 is a work piece 18 shown in dotted outline. The purpose of the clamp-down device, made up of the elements 10, 12 and 14, is to apply hold-down force against the work piece 18 to hold it securely on table 16.

Table 16 typically has an elongated slot 20 therein that is T-shape in cross-sectional configuration, that is, that has a wider slot portion connecting a narrower width upper slot portion that communicates with the table surface. The T-shape slot wider portion 20A is seen in dotted outline. T-shape slot wider portion 20A receives the head 22A of a tie down bolt 22 shown in dotted outline. The tie down bolt includes a washer 24 and a nut 26.

Heel portion 10 is generally cylindrical in external configuration and has an integral base portion 28 having a generally flat lower surface 30 that rests upon table 16. The lower surface 30 is not affixed to table 16 so that the heel member may be freely moved to the desired position on table 16.

Integrally upwardly extending from the base portion 28 is a thick wall tubular portion 32. The tubular portion 32 has an upwardly spiraled upper surface 34 defined by a series of individual steps 34A. Each of the steps 34A is preferably arranged of a different elevational height from the heel member lower surface 30.

The heel member tubular wall 32 is thus of varying lengths (or heights) starting with a step that is closely spaced to the heel member lower surface 30 and ending with a step that is at the maximum space from the lower surface 30.

Pin member 12 has an inner end 12A and an outer end 12B. The inner end 12A is secured to the heel member 10. In the illustrated arrangement the heel member base portion 28 has an opening 36 therethrough which receives the portion of the pin member adjacent the inner end 12A. To secure the pin member to the heel portion, welding 38 may be applied at inner end 12A so that the pin is non-removable from the heel member after assembly of the clamp-down device. Rather than welding 38, it can be seen that pin member 12 may be press-fit into opening 36 or it may be externally threaded and opening 36 threaded so that the members are threaded together. In any event, pin 12 is not intended to be easily removable from the heel member.

The outer end 12B of the pin has an enlarged diameter head 40.

The clamping bar 14 has an inner end 14A and an outer end 14B. Adjacent the inner end is an opening 42 that slidably receives pin member 12. Opening 42 is of smaller diameter than the external diameter of head 40 so that it is not removable from the pin but the opening 42 is sufficiently large to permit heel member 10 to be rotated relative to the clamping bar, and the clamping bar slid back and forth on the pin.

The clamping bar 14 is configured on the lower surface 44, adjacent the outer end 14B thereof, to engage a work piece 18. In the illustrated arrangement a radius-type recess 46 is formed in the lower surface 44 that is particularly adaptable for engaging a cylindrical work piece so as to hold it more effectively against table 16.

The clamping bar upper surface 48 is preferably generally planar and receives a washer 24 thereon. The intermediate portion of the clamping bar, that is, the portion between the inner end 14A and outer end 14B is configured to receive a tie down bolt 22. This is preferably arranged, as illustrated in FIG. 2, wherein clamping bar 14 is of Y-shape configuration providing an elongated slot 50 that communicates with the outer end 14B, slot 50 serving to receive tie down bolt 22.

The lower surface 44 of the clamping bar, adjacent the inner end 14A thereof, is provided with an integral downwardly extending narrow width boss portion 52 that is configured to engage an individual step 34A on the heel member.

To apply the clamp down device, the user positions the work piece 18 in the desired location and positions the lower surface 44 of the clamping bar on the work piece in a manner so as not to interfere with work to be performed on the work piece. The user then holds the clamping bar 14 generally parallel to table 16 with one hand and rotates heel member 10 about pin member 12 until the boss portion 52 rest upon a step 34A. That is, heel member 10 is rotated until a step 34A is found of a height above the lower surface 30 that is appropriately the height of the work piece 18 at the area thereof to be engaged by the outer end of the clamping bar. Thereafter nut 26 on the tie down bolt 22 is tightened, pulling the clamping bar toward table 16. The inner end portion of the clamping bar is held by heel member 10, and the outer end portion is thereby forced against work piece 18. Sufficient tightening of nut 26 ensures that work piece 18 will be held in the selected position against table 16 while work is being performed thereon.

The variable height work table clamp-down device thus illustrated and described provides an easy to use assembly which permits workmen to quickly and easily adapt the assembly to provide a clamping bar generally supported parallel to a work table. The clamping bar is retained at all times in relationship to the heel member 10 so that the pieces are not separable and are always available for easy use.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

We claim:

1. A variable height work table clamp-down device for holding variable height work pieces on a work table, the table having means for retaining a tie down bolt upwardly extending therefrom, comprising:

a heel member having a generally planar lower surface adapted for resting on the surface of a work table and an upwardly extending thick wall tubular portion having an upwardly spiraled upper surface defined by a series of steps, the tubular axis of the tubular portion being generally perpendicular to the heel member lower surface;

an elongated pin member having an upper and a lower end, the lower end being affixed to said heel member and the pin member extending upwardly from said heel member, the longitudinal axis thereof being substantially coincident with said heel member tubular portion tubular axis, the pin member having an enlarged diameter head portion at its upper end;

an elongated clamping bar having an inner end and outer end and an intermediate portion and having an opening therethrough adjacent said inner end slidably receiving said pin member, the outer end being configured to engage a work piece, and boss means adjacent and spaced from said inner end configured to engage a said step on said heel member tubular portion upper surface whereby the height of the clamping bar inner end above a table is selectably adjustable, the clamping bar intermediate portion having means to receive a tie down bolt, said pin head portion being of diameter greater than said clamping bar opening whereby said heel member and said clamping bar are secured to each other.

2. A variable height work table device for use on a work table according to claim 1 wherein said clamping bar intermediate portion has an elongated slot opening therethrough for receiving a tie down bolt.

3. A variable height work table device for use on a work table according to claim 1 wherein said clamping bar has a lower surface facing a work table, the lower surface being defined in part adjacent said outer end by a contoured recess therein.

4. A variable height work table device for use on a work table according to claim 1 wherein said heel member has an opening therethrough substantially coincident with said tubular portion tubular axis, the heel member opening receiving said lower end portion of said pin member.

* * * * *